United States Patent [19]

Cole et al.

[11] 4,445,919

[45] May 1, 1984

[54] IN SITU RAPID WASH APPARATUS AND METHOD

[75] Inventors: William E. Cole, Sudbury; Drew P. O'Connell, Townsend; James L. Griffith, Newton, all of Mass.

[73] Assignee: Thermo Electron Corporation, Waltham, Mass.

[21] Appl. No.: 474,769

[22] Filed: Mar. 14, 1983

[51] Int. Cl.$^3$ .................... C03B 5/26; C03B 3/00
[52] U.S. Cl. ..................................... 65/27; 34/10; 34/85; 34/57 A; 55/21; 55/96; 55/242; 65/29; 65/335; 134/22.19; 134/166 R; 134/167 R; 422/140; 432/2
[58] Field of Search ............... 422/140; 134/22.19, 134/167 R, 166 R; 55/21, 96, 242, 283; 65/27, 134, 335, 29; 34/10, 85, 57 R, 57 A; 432/2, 58

[56] References Cited

U.S. PATENT DOCUMENTS

| Re. 18,328 | 1/1932 | Fedler | 55/96 |
|---|---|---|---|
| 1,281,597 | 10/1918 | Lessing | 34/57 A |
| 1,962,114 | 6/1934 | Emmich | 257/206 |
| 2,482,187 | 9/1949 | Johnson | 34/10 X |
| 2,653,116 | 9/1953 | Whitcomb et al. | 134/22.19 X |
| 2,788,008 | 4/1957 | Wanzer | 134/101 |
| 2,824,519 | 2/1958 | Wright et al. | 103/12 |
| 2,946,569 | 7/1960 | Kirkby | 257/1 |
| 3,045,978 | 7/1962 | Waldhofer | 257/1 |
| 3,207,824 | 9/1965 | Wurster et al. | 34/10 X |
| 3,253,944 | 5/1966 | Wurster | 34/57 A X |
| 3,617,037 | 11/1971 | Foch | 432/58 X |
| 3,895,465 | 7/1975 | Korn et al. | 51/320 |
| 4,190,963 | 3/1980 | Christensen et al. | 34/85 X |
| 4,204,572 | 5/1980 | Wilkstrom | 165/95 |
| 4,217,116 | 8/1980 | Seever | 55/96 |
| 4,247,227 | 1/1981 | Göhler et al. | 55/283 X |
| 4,374,660 | 2/1983 | Sakhuja et al. | 65/27 X |

FOREIGN PATENT DOCUMENTS 2095126   9/1982   United Kingdom ................. 55/242

OTHER PUBLICATIONS

Cusdin et al, "A Marine Fluidized Bed Waste Heat Boiler," *Trans. I. Mar. Eng.*, Oct. 1978, pp. 1-12.
Wei et al, "Brayton Cycle Heat Recovery For Container-Glass Melting Furnace,", pp. 624-631.
Nyez et al, "A Waste-Heat Recovery Boiler on a Glass--Melting Furnace,", pp. 24-37.

*Primary Examiner*—Robert L. Lindsay, Jr.
*Attorney, Agent, or Firm*—Herbert E. Messenger

[57] ABSTRACT

Disclosed are a method and apparatus for delivering a solvent in the liquid state to a surface to be cleaned. The volume of the solvent and the time interval during which it is applied to the surface are selected so that the solvent reaches the surface in the liquid state. In a preferred embodiment, the solvent is water which is sprayed at selected time intervals onto the lower surface of the distributor plate supporting a fluidized bed of glass batch material for preheating.

9 Claims, 3 Drawing Figures

IN SITU RAPID WASH APPARATUS AND METHOD

BACKGROUND OF THE INVENTION

This invention relates to rapid wash methods and apparatus for removing deposits from surfaces and more particularly to the cleaning of deposits from surfaces exposed to flue gases.

It is well known that enormous quantities of heat are wasted as flue gases from various manufacturing processes are vented to the atmosphere. It is also known to place heat exchangers in contact with the flue gases for recovering some of the heat which otherwise would be lost. The use of heat recovery techniques has been severely limited, however, because contaminants contained in flue gases foul the heat exchange equipment. For example, the contaminants form deposits on the heat transfer surfaces of the heat exchanger thereby drastically reducing the amount of heat which can be recovered from the flue gases. In heat recovery systems in which flue gases are passed through a distributor plate to preheat batch materials before introduction of the materials into a furnace, the perforated distributor plate which supports the batch in a fluidized bed becomes clogged with the contaminants. In particular, in the manufacture of glass, heat recovery distributor plates become clogged with deposits of sodium sulfate. This clogging restricts flow of the flue gases thereby increasing the pressure drop across the distributor plate and reducing heat transfer into the fluidized bed. Energy is therefore lost in two ways: (1) reduced heat transfer into the bed reduces total energy recovered, and (2) the increased pressure drop results in higher power consumptions in flue gas blowers.

In order to use heat recovery techniques effectively in a flue gas environment, rigid maintenance schedules must be followed to clean the deposits from the heat exchange apparatus. In addition, other equipment which is exposed to flue gases must be cleaned or its operation will be impaired. As an example, air pollution control equipment which is placed in a flue to reduce contaminants often becomes coated with the contaminants thereby rendering the equipment relatively ineffective because of the build-up of deposits.

Known techniques for cleaning the surfaces of heat recovery equipment are generally cumbersome and/or labor intensive. One known technique uses brushes, movable on tracks, to mechanically clean the heat transfer surfaces. Other methods include use of air lances to direct a high velocity jet of air against the coated surfaces, shot blasting, steam cleaning and vacuum cleaning. Air lances are generally moved manually to effect cleaning. These methods often cannot be used in situ as the manufacturing process proceeds thereby necessitating periodic shutdowns for maintenance.

It is therefore an object of this invention to provide apparatus and method for cleaning, in situ, the surfaces of heat exchange and other equipment during exposure to flue gases.

It is a further object of this invention to provide such apparatus which is uncomplicated, inexpensive and easty to construct and maintain.

It is a further object of this invention to provide apparatus for cleaning heat exchange and other equipment without interrupting the manufacturing process.

SUMMARY OF THE INVENTION

The apparatus disclosed herein for cleaning deposits from surfaces exposed to flue gases includes means for delivering a solvent to the surface. The volume of the solvent or its instantaneous flow rate, and the interval of time of application are selected so that the solvent reaches the surface in the liquid state. The time between applications of solvent may vary depending on temperature and rate of particle deposition but the total time of application is always less than one percent and preferably is less than one-tenth of one percent of the total time the surfaces are exposed to flue gases.

In a preferred embodiment adapted particularly for cleaning the distributor plate of a fluidized bed glass batch preheater, nozzles are employed to spray water upwards against the lower surface of the plates. The time intervals between sprays and spray duration are either preselected or determined by the pressure drop measured across the distributor plate. The power requirements of the cleaning system are small and the energy lost from the flue gases is less than four percent.

BRIEF DESCRIPTION OF THE DRAWING

The invention disclosed herein will be better understood with reference to the drawing of which.

DESCRIPTION OF PREFERRED EMBODIMENTS

The apparatus and method disclosed herein will now be described with reference particularly to the cleaning of a distributor plate which supports a fluidized bed of glass batch material to preheat it before the batch material enters a glass-making furnace. It should be understood that the apparatus and process are well suited to the cleaning of other types of heat exchange and other equipment which are exposed to flue gases such as air pollution control equipment and flow-measuring devices such as orifice plates.

In the glass-making industry, it is known to preheat the glass batch material before it enters the furnace by using what would otherwise be waste heat from the flue gases from the furnace itself. In general, the flue gases percolate through the batch material in a preheater thereby giving up some of the heat to the batch material. In order to enhance heat transfer from the flue gases to the batch material and to allow the batch material to flow from the preheater into the furnace, the flow of flue gas is controlled so that the particles of batch material are levitated by the gases so as to form a fluidized bed. A fluidized bed behaves much as a liquid so that the batch material can be moved quite easily from the preheater into the furnace.

Figure 1:
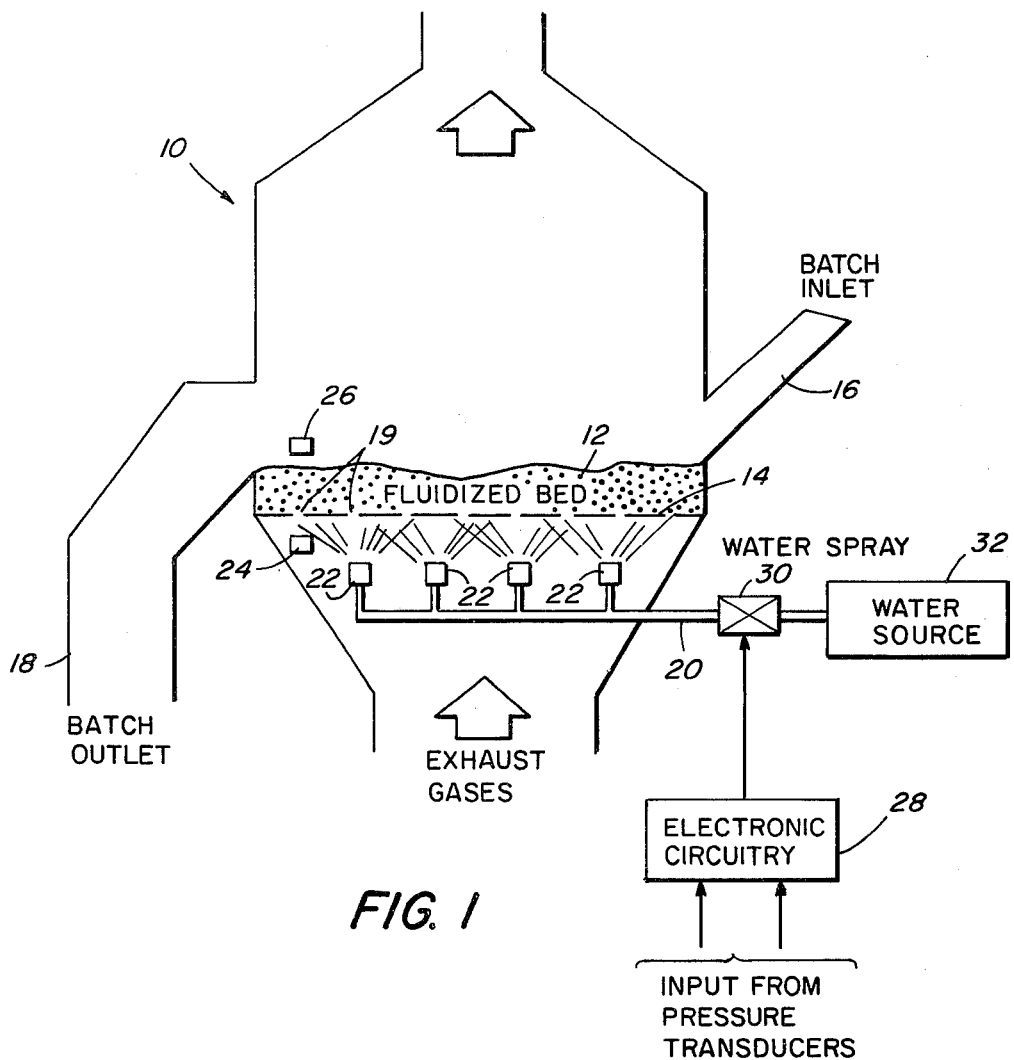
FIG. 1 is a schematic diagram showing the apparatus disclosed herein for use in cleaning the distributor plate of a batch preheater for a glass furnace.

Referring to FIG. 1, a batch preheater 10 includes a fluidizable bed of batch material 12 supported by a distributor plate 14. The glass batch material 12 generally includes sand, limestone, and soda ash and is fluidized by means of the heated flue gases passing up through the preheater 10 from a glassmaking furnace (not shown). The batch material 12 continually flows into the preheater 10 from a batch inlet 16 and flows out through a batch outlet 18 into the furnace (not shown). The distributor plate 14 is generally a perforated metal plate having a multiplicity of holes 19 of selected size such as approximately 1/16 of an inch in diameter. During operation of the preheater 10, the holes 19 in the distributor plate 14 tend to become clogged with deposits which are largely sodium sulfate. These deposits will reduce the size of or close off the holes in the distributor plate 14 thereby increasing the pressure drop across the distributor plate 14. As the distributor plate 14 becomes clogged, the velocity of gas flow through the fluidized bed 12 decreases thereby cutting down on heat transfer and tending to disrupt the fluid nature of the fluidized bed 12.

To permit removal of the deposits, a water pipe 20 is provided which carries a plurality of nozzles 22. The nozzles 22 are arranged for spraying water onto the lower surface of the distributor plate 14 so that substantially all of the surface area of the distributor plate 14 is contacted with water. It should be noted that the apparatus disclosed herein is intended to be used during the operation of the preheater 10 and that the flue gases passing through the preheater 10 typically have a temperature in the range of about 800° to 1200° F.

When the distributor plate 14 becomes clogged, a volume of water is discharged through the nozzles 22 to clean the plate. It has been found that when the volume of water and the time interval during which it is sprayed are selected so that the water hitting the distributor plate 14 is in the liquid state, the deposits clogging the distributor plate 14 will dissolve, be weakened mechanically, and then be virtually completely dislodged from the distributor plate 14 by the flowing gases. In order that the water be in the liquid state when it contacts the deposits on the distributor plate 14, it has been determined that water must be discharged at a relatively high instantaneous flow rate. In particular, for test apparatus including a distributor plate having an area of about 1 ft$^2$, it has been found that approximately 0.02 gallons of water delivered to the distributor plate 14 in an interval on the order of 0.1 to 0.3 seconds will result in the water remaining liquid when it contacts the deposits on the distributor plate 14 thereby effectively cleaning the plate 14. If the selected time interval is 0.3 seconds, an appropriate instantaneous flow rate is thus approximately 3.8 gallons/min/ft$^2$. It should be apparent that the volume of water used will vary with the sizes of the distributor plate and the degree of particle deposition. If the flow rate is not sufficiently high, the water vaporizes in the flue gases before it comes in contact with the distributor plate 14 so that the deposits do not dissolve and the desired cleaning is not achieved.

It is important for several reasons that the volume of water used be as small as possible. First of all, the water which is introduced, although remaining in the liquid state until contacting the distributor plate 14, nevertheless will evaporate thereafter as it passes through the fluidized bed 12. This evaporation absorbs heat from the flue gases so that less heat is available for the preheating operation. Use of minimum amounts of water permits more heat to remain available for preheating the batch material in the fluidized bed 12. Furthermore, in many situations it is critical that virtually no water pass through the distributor plate 14 into the fluidized bed 12. When the fluidized bed includes glass batch, for example, water contacting the batch material causes it to form a concrete-like mass unsuited for subsequent introduction into the furnace. An excess volume of water may also create a large pressure pulse in the preheater 10 when it flashes to steam. Such a pressure pulse might damage the preheater 10 and other equipment. It is therefore important that the volume of water and its rate of delivery be generally within prescribed limits so that the water is liquid when it contacts the distributor plate 14 but does not significantly wet the material in the fluidized bed 12. As stated earlier, when liquid water contacts the deposits, the deposits begin to dissolve and thus become mechanically weak. The high velocity flue gases will then strip the weakened deposits away from the distributor plate 14.

Still referring to FIG. 1, there are several ways of activating the water spray to clean the distributor plate 14. One preferred method is to measure the pressure drop across the distributor plate 14 and activate the nozzles 22 when a preselected pressure drop is detected. To carry out this method, pressure transducers 24 and 26 are located below and above the distributor plate 14. The outputs of the conventionally-known pressure transducers 24 and 26 are connected as inputs to electronic circuitry 28 which controls a solenoid valve 30 which connects the water pipe 20 with a water source 32. Thus, when the preselected pressure drop is detected by the pressure transducers 24 and 26 the electronic circuitry 28 will activate the solenoid 30 so that water from the water source 32 will flow through the water pipe 20 and thereafter through the nozzles 22 to effect cleaning of the distributor plate 14. It is preferred that the electronic circuitry 28 include timing means which will close the solenoid valve 30 at a preselectable time interval after it has been opened, for example, 0.1 to 0.5 seconds. Somewhat longer time intervals may be necessary depending on the particular application. In this way, a known volume of water is delivered to the distributor plate 14. Alternatively, the electronic circuitry 28 can close the solenoid valve 30 when the pressure drop detected by the pressure transducers 24 and 26 has decreased to another preselectable level.

Another method for activating the water spray eliminates the need for the pressure transducers 24 and 26. In this case, the electronic circuitry 28 simply activates the solenoid 30 at preselectable, regular time intervals such as every half hour. As before, the solenoid valve 30 is maintained open for a selected time interval such as an interval in the range of approximately 0.1 to 0.5 seconds. In tests it has been found that for flue gas temperatures 500° to 1000° F. spraying at intervals of approximately ten minutes to one hour will maintain the distributor plate 14 relatively free of deposits. Longer intervals between sprays are possible if increased pressure drops are deemed tolerable. The tradeoff between water usage and power usage is decided on a case to case basis. Of course, the length of time necessary for cleaning the distributor plate will also vary from installation to installation. Time intervals for spraying of one or two seconds or more may be required where temperatures are over 1000° F. and/or the rate of particle deposition is high.

In test apparatus in which the distributor plate 14 had an area of 1 ft$^2$, it has been found that average water consumption is approximately 2.4 gallons per day with a maximum of about 4 gallons per day. The use of this small volume of water required less than 4% of the energy content of the flue gases as it evaporated.

Figure 2:
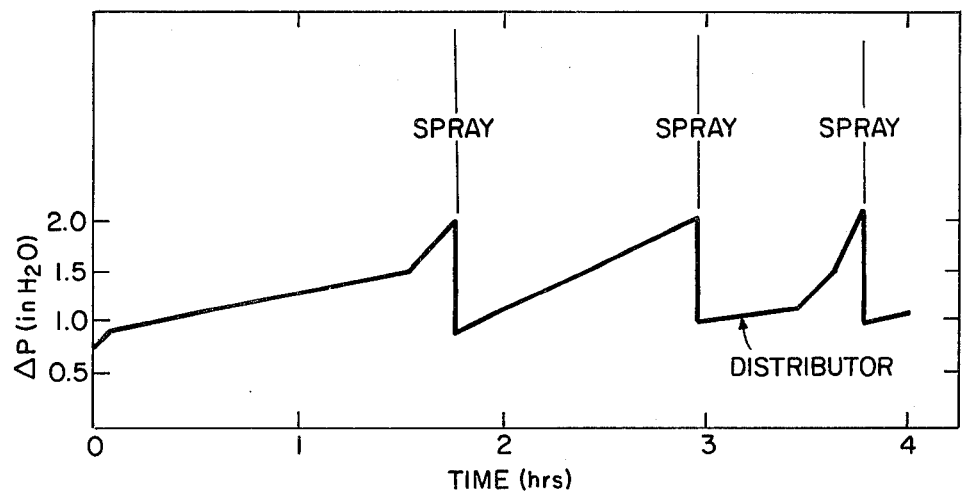
FIG. 2 is a graph illustrating the change in pressure before and after cleaning a distributor plate.

FIG. 2 is a graph of pressure drop versus time illustrating the effectiveness of the above-described cleaning process. Note that the pressure differential builds up with time and then quickly decreases when the spray is activated. As this graph indicates, the distributor plate is cleaned virtually instantaneously when the spray is activated.

Figure 3:
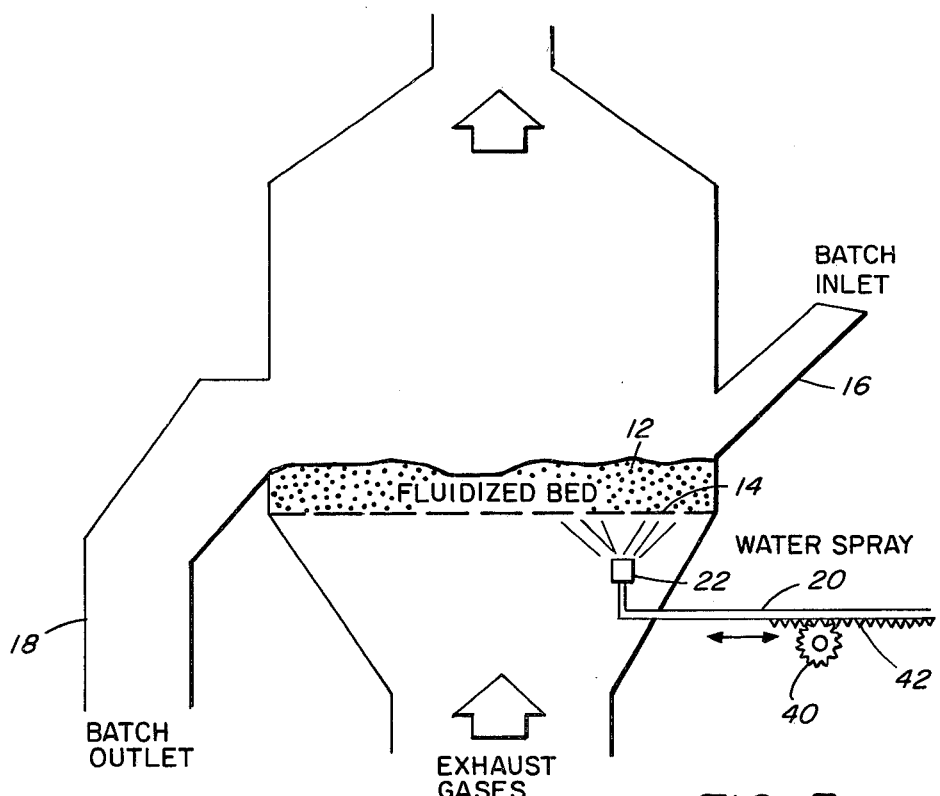
FIG. 3 is a schematic representation of an embodiment in which a single nozzle moves across the surface area of the distributor plate.

FIG. 3 is a schematic illustration of an embodiment of the invention in which but a single spray nozzle 22 is employed. In this embodiment means are provided for moving the single nozzle 22 back and forth across the distributor plate 14 to clean away the deposits. For example, a motor (not shown) can be employed to drive a gear 40 which is adapted to mate with teeth 42 on the water pipe 20. By this mechanism as the gear 40 rotates, the nozzle 22 will be driven across the distributor plate 14. It should be noted that FIG. 3 is illustrative and other means for moving the nozzle 22 across the distributor plate 14 may be employed. One alternative would be a linearly-acting hydraulic piston/cylinder arrangement (not shown). Also, the nozzle 22 may be moved in two dimensions to assure coverage of substantially all of the surface area of the plate 14, or a rakelike array of nozzles may be used instead of the single nozzle 22.

While the invention has been described in reference to cleaning a distributor plate exposed to flue gases in the glass making process, it should be understood that the invention can be used for cleaning deposits from other equipment exposed to flue gases in a variety of manufacturing processes. As discussed above, the flue gases from the glass making process contain sodium sulfate which is water-soluble. The invention can also be used to remove deposits which are not water soluble. for example, if the troublesome deposits are soluble in alcohol, alcohol can be used in place of water. In such a case, the volume of alcohol and the time interval of its spraying will be selected so that the alcohol remains in the liquid state when it contacts the deposit. Deposits in other industrial processes may be soluble in an acidic environment. In this case, an acidic solvent would be employed. As with water and alcohol such an acidic solvent would be applied so that it remained in the liquid state when it contacted the surface to be cleaned.

It is thus seen that the objects of this invention have been achieved in that there has been described apparatus for cleaning surfaces exposed to flue gases which is highly effective and yet simple to construct and maintain. In particular, the method requires delivering a solvent to the surface to be cleaned in such a way that the solvent remains in the liquid state when it contacts the surface. In this way, the deposits dissolve so that the surface is cleaned. While the invention has been described with reference to preferred embodiments in which water is the solvent, it should be recognized that this description is illustrative only, and should not be considered to limit the scope of the invention.

What is claimed is:

1. In heat exchange apparatus for preheating glass batch supported in a fluidized bed on a perforate distributor plate exposed to flue gases from a glass-making furnace,
   a method for cleaning deposits from said perforate distributor plate, in situ, comprising delivering a volume of solvent in liquid form to said distributor plate during a time interval, said volume of solvent and said time interval selected so that said solvent is in the liquid state when it contacts said distributor plate and the total time during which said solvent is delivered to said plate is less than one percent of the time said surfaces are exposed to flue gases.

2. The method of claim 1 wherein said volume and said time interval are further selected to substantially prevent wetting of said batch in said fluidized bed.

3. The method of claim 2 wherein said volume and said time interval are further selected to substantially prevent disruption of the fluidized bed by flashing of water to steam.

4. The method of claim 1 wherein said solvent is water.

5. The method of claim 1 wherein said volume is in the range of about 0.006 to 0.048 gallons per ft$^2$ of surface area of said distributor plate and said time interval is in the range of about 0.1 to 0.8 seconds.

6. A method as in claim 4 wherein said total delivery time of water is less than one-tenth of one percent of the time said surfaces are exposed to flue gases.

7. In heat exchange apparatus for preheating glass batch supported in a fluidized bed on a perforate distributor plate exposed to flue gases from a glass-making furnace, apparatus for cleaning deposits from said perforate distributor plate, in situ, comprising at least one nozzle mounted below said perforate distributor plate and adapted to deliver a solvent in liquid form to said distributor plate, and timing means for controlling the operation of said nozzle such that the nozzle delivers solvent less than one percent of the time said plate is exposed to flue gases.

8. The apparatus of claim 7 including a plurality of nozzles arranged so that their spray pattern completely covers said distributor plate.

9. The apparatus of claim 7 further including means for moving said nozzle substantially parallel to said distributor plate in a manner such that the solvent delivered by said nozzle contacts substantially all of said distributor plate.

* * * * *